Jan. 28, 1936.  K. E. KYLÉN  2,029,265

MULTIROW CYLINDRICAL ROLLER BEARING

Filed Feb. 7, 1935

INVENTOR.
Karl Erik Kylén
BY
his ATTORNEY.

Patented Jan. 28, 1936

2,029,265

UNITED STATES PATENT OFFICE 2,029,265

MULTIROW CYLINDRICAL ROLLER BEARING

Karl Erik Kylén, Goteborg, Sweden, assignor to Aktiebolaget Svenska Kullagerfabriken, Goteborg, Sweden, a corporation of Sweden Application February 7, 1935, Serial No. 5,331
In Germany May 30, 1934

8 Claims. (Cl. 308—212)

This invention is for improvements in or relating to multi-row cylindrical roller bearings of the type in which the outer race-ring is provided with flanges integral with the ring at both sides of the latter. Bearings of this kind are used to advantage in piston rod big end applications.

It is an object of the present invention to use removable guide-rings between the rows of rollers. If the inner race-ring is made without flanges it is then possible to remove it from the bearing whereby the sets of rollers remain in the outer ring which is provided with flanges. The outer as well as the inner race-ring may be mounted with press fit which is desirable in view of the intermittent and varying loads occurring in a piston rod bearing.

The present invention accordingly comprises a multi-row cylindrical roller bearing having in combination an inner race-ring, an outer race-ring formed with two integral flanges and one or more removable guide-rings each of which is located between adjacent rows of rollers in contact with the outer race-ring.

To permit of the insertion of the guide-rings they may be flattened or relieved at one or more places at the outer periphery or they may for the same purpose be made resilient so that they can be inserted over the flanges of the outer ring by being temporarily elastically deformed. If the cylindrical roller bearing is of small width it is necessary both to relieve the guide-rings at the outer periphery and deform them elastically, in order to facilitate their insertion over the flanges of the outer ring. The ovally deformed guide-rings resume their circular form after insertion in the bearing. The guide-rings having thus been positioned, the rollers are inserted. The outer ring together with the guide-rings and the sets of rollers then form a self-contained unit.

According to the invention it is furthermore proposed to provide the inner race-ring with holes for the introduction of lubricant between the sets of rollers. The introduction of lubricant into these holes may be rendered possible through corresponding holes in the shaft.

Furthermore, the guide rings may be made narrower towards the outer periphery so that their end surfaces are in contact with the rollers only at the central part, and whereby it becomes easier to swing the rings into position.

Figure 1:
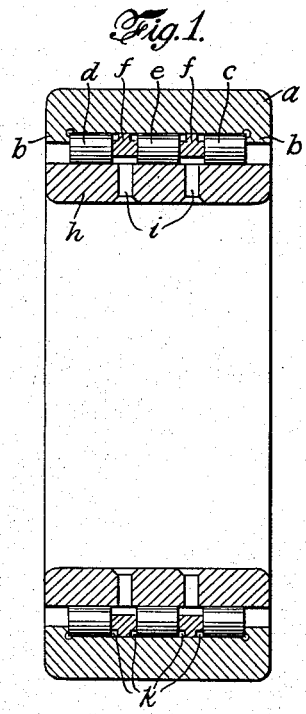

In order that the invention may be more clearly appreciated a preferred construction will now be described with the aid of the accompanying drawing, in which Figure 1 is a section of a triple-row cylindrical roller bearing, the section being taken in a plane containing the axis of rotation thereof.

Figure 2:
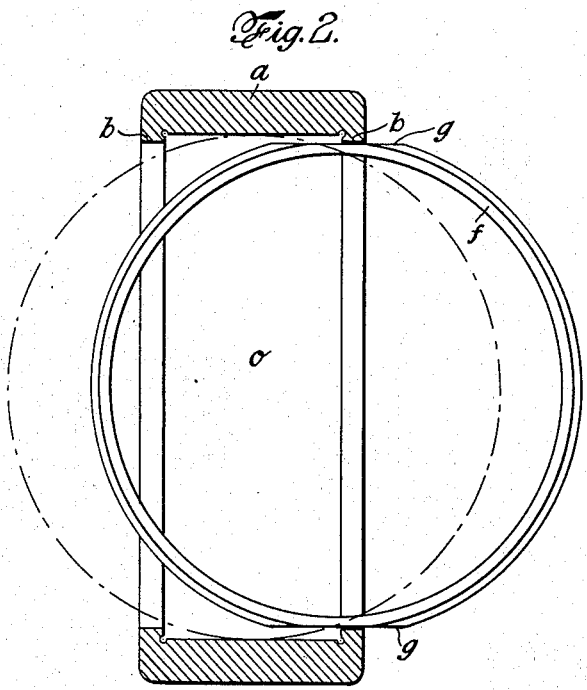
Figure 3:
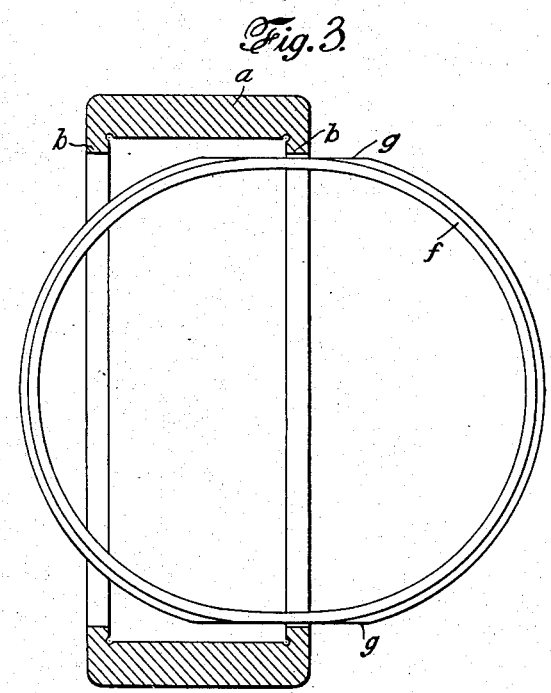

Figure 2 is a section in a similar plane of the outer race-ring and a relieved guide-ring turned into a plane at right angles for insertion into the outer ring and Figure 3 illustrates the manner of assembling the bearing using a guide-ring which is both relieved and elastically deformable.

Like reference letters indicate like parts in the several figures of the drawing.

The outer ring $a$ is provided with shoulders $b$ for the guidance of the sets of rollers $c, d$. Between the middle set of rollers $e$ and the side sets of rollers $c$ and $d$ are guide-rings $f$ which are centered on the race way surface of the outer ring $a$. As may be seen from Figure 2, the guide-ring is relieved or flattened at two diametrically opposed positions $g$. In this manner the ring can be inserted over the shoulders $b$ of the outer ring. In order to be able to swing the guide rings into place it is necessary that the proportions between the height of the shoulders $b$ and the total width of the outer roller race be such that the shoulders fall entirely outside a sphere having a diameter equal to the outer roller race way and having its center near the axial center of the bearing. This is illustrated in Figure 2 of the drawing. If the shoulder projects into this imaginary sphere it may be possible to insert the guide ring into the bearing race ring in a plane perpendicular to that of the race ring, but it would only be possible to swing it into its proper position in the bearing by flexing one of the rings.

According to Figure 3 the guide-ring $f$ is similarly relieved and it is furthermore made resilient so that it can be elastically deformed to permit of its introduction into the outer race-ring by oval deformation.

The inner race-ring is shown provided with holes $i$ for the introduction of lubricant between the sets of rollers. The introduction of lubricant at these places is facilitated as ample space is available between the inner race-ring $h$ and the guide-rings $f$. The guide-rings $f$ are made somewhat narrower towards the outer periphery as at $k$. In this manner the contact surfaces between guide-ring and set of rollers is reduced while the guide ring can still be centered by the outer race-ring. By relieving or chamfering the rings at their outer edges it becomes easier to swing them into position.

The rollers of the bearing according to the invention may if desired be retained by a cage.

Instead of relieving the guide-rings by flattening at two places the rings may be flattened at a single place. The flattening must then be made deeper, necessitating a thicker ring to prevent its breakage. The relieving need not necessarily be of flattened form but may be of some other convenient form. It is preferable that the guide-rings should bear against the outer race-ring along the greater part of its circumference as is the case in the construction illustrated but it may alternatively be designed to bear against the outer race-ring at a number of separated contact areas.

Having thus described my invention I claim and desire to secure by Letters Patent:

1. A multi-row cylindrical roller bearing comprising in combination, a number of rows of rollers, an inner race ring, an outer race ring formed in one piece with two inwardly directed integral flanges adjacent its respective sides, and one or more removable guide rings located between adjacent rows of rollers and in contact with the outer race ring.

2. A multi-row cylindrical roller bearing comprising in combination an inner race ring, an outer race ring formed with two integral flanges adjacent its respective sides, and one or more removable guide rings located between adjacent rows of rollers and in contact with the outer race ring, each guide ring being so relieved that it can be inserted into the outer race ring by movement into the ring in a plane perpendicular to the general plane of the ring, the proportions between the heighth of the flanges and the total width of the outer race ring being such that the shoulders fall entirely outside of a sphere having a diameter equal to the outer roller race way and having its center at or near the axial center of such race way.

3. A multi-row cylindrical roller bearing comprising in combination, a number of rows of rollers, an inner race ring, an outer race ring formed in one piece with two inwardly directed integral flanges adjacent its respective sides, and one or more removable guide rings located between adjacent rows of rollers and in contact with the outer race ring, each guide ring being relieved by flats at two diametrically opposite positions whereby it can be inserted into the outer race ring by movement into the ring in a plane perpendicular to the general plane of the ring, the proportions between the heighth of the flanges and the total width of the outer race ring being such that the shoulders fall entirely outside of a sphere having a diameter equal to the outer roller race way and having its center at or near the axial center of such race way.

4. A multi-row cylindrical roller bearing comprising in combination, a number of rows of rollers, an inner race ring, an outer race ring formed in one piece with two inwardly directed integral flanges adjacent its respective sides, and one or more removable guide rings located between adjacent rows of rollers and in contact with the outer race ring, each guide ring being formed of resilient material so that upon being deformed elastically it can be introduced into the other race ring, by movement into the ring in a plane perpendicular to the general plane of the ring, the proportions being the heighth of the flanges and the total width of the outer race ring being such that the shoulders fall entirely outside of a sphere having a diameter equal to the outer roller race way and having its center at or near the axial center of such race way.

5. A multi-row cylindrical roller bearing comprising in combination an inner race ring, an outer race ring formed with two integral flanges adjacent its respective sides, and one or more resilient removable guide rings located between adjacent rows of rollers and in contact with the outer race ring, each guide ring being so relieved that upon being deformed elastically it can be inserted into the outer race ring by movement into the ring in a plane perpendicular to the general plane of the ring, the proportions between the heighth of the flanges and the total width of the outer race ring being such that the shoulders fall entirely outside of a sphere having a diameter equal to the outer roller race way and having its center at or near the axial center of such race way.

6. A multi-row cylindrical roller bearing comprising in combination, a number of sets of rollers, an inner race ring, provided with holes for the introduction of lubricant between the sets of rollers, an outer race ring formed with two integral flanges adjacent its respective sides, and one or more removable guide rings located between adjacent rows of rollers and in contact with the outer race ring, each guide ring being so relieved that it can be inserted into the outer race ring by movement into the ring in a plane perpendicular to the general plane of the ring, the proportions between the heighth of the flanges and the total width of the outer race ring being such that the shoulders fall entirely outside of a sphere having a diameter equal to the outer roller race way and having its center at or near the axial center of such race way.

7. A multi-row cylindrical roller bearing comprising in combination, a number of rows of rollers, an inner race ring, an outer race ring formed in one piece with two inwardly directed integral flanges adjacent its respective sides, and one or more removable guide rings located between adjacent rows of rollers and in contact with the outer race ring, the guide rings being formed narrower toward their outer periphery, for reducing the contact surfaces between the guide rings and the rollers and facilitating swinging the rings into position during assembly.

8. A multi-row cylindrical roller bearing comprising in combination an inner race ring, an outer race ring formed with two integral flanges adjacent its respective sides, and one or more removable guide rings which are formed narrower toward their outer periphery, located between adjacent rows of rollers and in contact with the outer race ring, each guide ring being so relieved that it can be inserted into the outer race ring by movement into the ring in a plane perpendicular to the general plane of the ring, the proportions between the heighth of the flanges and the total width of the outer race ring being such that the shoulders fall entirely outside of a sphere having a diameter equal to the outer roller race way and having its center at or near the axial center of such race way.

KARL ERIK KYLÉN.